Jan. 21, 1936. J. H. RUBENSTEIN Re. 19,834

WIRELESS TRANSMISSION SYSTEM

Original Filed Feb. 18, 1932

INVENTOR.

Jacob H. Rubenstein

BY

Harry D. Wallace

ATTORNEY.

Reissued Jan. 21, 1936 Re. 19,834

UNITED STATES PATENT OFFICE 19,834

WIRELESS TRANSMISSION SYSTEM

Jacob H. Rubenstein, Syracuse, N. Y.

Original No. 1,906,769, dated May 2, 1933, Serial No. 593,819, February 18, 1932. Application for reissue April 26, 1935, Serial No. 18,423

7 Claims. (Cl. 179—2)

This invention relates to a wireless system whereby audio signals may be transmitted and received through an electric lighting circuit ground and an auxiliary ground, and has for its object to provide such a system wherein music, speech, or other signals may be received, amplified and simultaneously distributed to head phones or loud speakers, which may be arranged in multiple across the two grounds and may be located in various rooms of hotels, hospitals, dwellings, or the like. A further object is to connect a very low impedance secondary coil across the two grounds and couple thereto a primary or output of an audio amplifier, whereby audio frequency currents may be induced in the said ground lines. A further object is to connect between the said ground lines, at any suitable point, a coil, or a plurality of coils (head phones or loud speakers), whose impedance in circuit with the secondary coil is low like that of the secondary coil and preferably substantially matches the impedance of said secondary coil, whereby the audio energy may be reconverted into sound waves or audible frequency at a maximum efficiency. And a further object is to provide an extremely simple, economic, and automatic transmission system for the reception and distribution of entertainment programs and other signals, that requires no special wiring of any buildings, in order to receive and transmit audio and other signals as long as a lighting circuit ground and an auxiliary ground may be conveniently utilized for the purpose.

I attain these objects by the means set forth in the detailed description which follows, and as illustrated by the accompanying drawing, in which—

Figure 1:
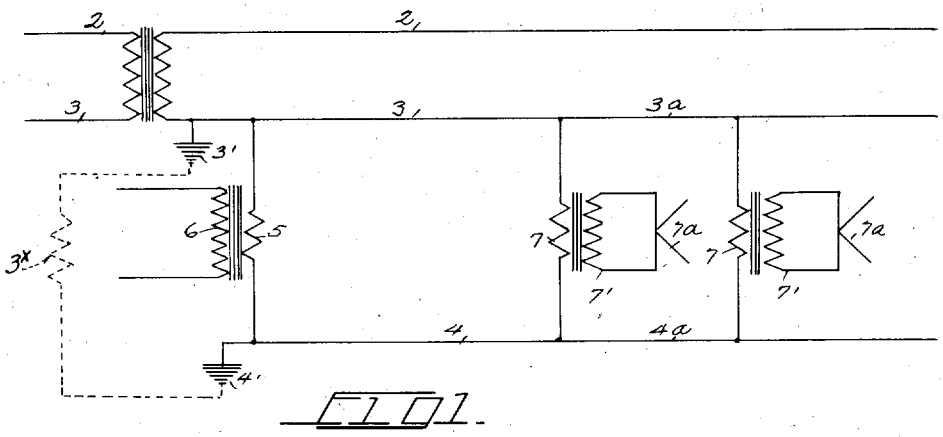
Figure 2:
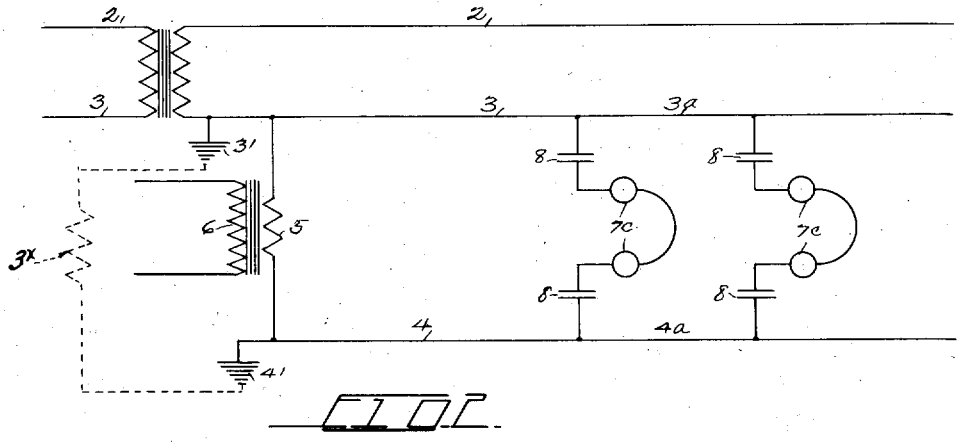

Figure 1 shows diagrammatically an electric lighting cicuit having one wire grounded and an auxiliary ground, also showing output of an audio amplifier, and audio receiving sets equipped with loud speakers; and Figure 2 shows the substitution of a number of head phones for the loud speakers of Fig. 1, also showing condensers in each of the head phone circuits.

The invention contemplates the establishment of a wireless transmission system, wherein an indefinite number of the individual receiving sets, such as head phones and loud speaker units may be connected in parallel across two ground lines, one of said lines preferably comprising the grounded side of any ordinary electric lighting system, the other line comprising a water, gas, or steam pipe, forming parts of the usual installations for household or office conveniences, and wherein the entire series of local receiving sets may be under the control of a master radio (not shown), which may be equipped with antenna, dials, and audio amplifier, and may be set once or oftener each day to transmit to the local sets programs or signals of different wave lengths, the persons seeking the entertainment having no duties to perform except to simply turn on and turn off their individual receiving sets. This master radio may be located in any part of a building within convenient reach of the lighting circuit and auxiliary grounds.

Referring to the drawing, 2—3 represent the conductors of the lighting system, the wire 3 being grounded, as at 3', and 4 represents a water or gas pipe which may serve as the auxiliary ground. 5 represents a relatively low impedance secondary coil, which is connected across the grounds 3 and 4, to which is coupled a primary coil, as 6, the latter being virtually the output of an audio amplifier (not shown). By this peculiar arrangement, it has been proven that audio energy or currents may be induced in the grounds 3—4 of sufficient potential to operate a number of independent audio receiving and transmitting sets. In this connection, it may be explained that actual measurements of resistance from the ground wire 3 to the auxiliary ground 4 taken, for example, on the dotted lines 3*x* of Figs. 1 and 2 shows that the said resistance varies with different AC outlets, the range being anywhere from ½ to 10 ohms. It has further been found that the very low impedance secondary coil 5 may be connected across the lines 3—4 without much loss of energy in said lines due to their mutual grounding and the impedance of the secondary 5 being less than the ohmic resistance from line 3 to line 4. It having been demonstrated by the foregoing arrangement and tests that audio currents may be induced in lines 3 and 4, the next step contemplates connecting at any suitable point, as in the portions 3*a*—4*a* of lines 3—4, one or more primary coils, as 7—7*c*, in order to reconvert the audio energy into sound waves or audible frequency that will effect the perfect rendition of music, speech of other programs. The coils 7 are preferably coupled to secondary coils 7', whose impedance approximately matches the loud speakers, as 7*a*. Any suitable number of the coils or receiving devices 7'—7*c* may be connected in parallel across the lines 3—4 and constitute a series of individual sets which may be located in the various rooms of apartment houses, office buildings and hotels and simultaneously render identical programs under the control of the master radio, as explained. By this construction and arrangement, programs or signals of varying wave lengths may be selected by the master radio and rendered simultaneously throughout the said building, at the will of the owners of occupants of the rooms, without liability of any interference and without battery, or machine generated current carrying wires, except as shown in the diagrams 1 and 2.

Condensers, as 8, shown in Fig. 2, may be coupled with head phone circuits or coils 7c, in order to eliminate any lighting circuit frequency humming that may be educed by the ground 3. This elimination of the humming is facilitated by the higher frequency in the condensers 8, as compared with the relatively low frequency of the lighting circuit 2—3, which enables the condensers to prevent the passing of said low frequency humming. On the other hand, in the case of the loud speaker circuits (see Fig. 1), due to the low impedance of the primary coils 7 and the higher impedance of the coils 7′, the humming of the lighting circuit 2—3 is automatically eliminated without the aid of the condensers 8.

In case some of the rooms of a building are equipped with audio frequency producers of the loud speaker type, while other rooms have only the ordinary head phones, provision is made for diversifying the installations, as may be understood by comparing Fig. 1 with Fig. 2 of the drawing, wherein are respectively shown loud speaker circuits 7—7′; or else simple head-set circuits, as 7c. In either case, the installation of the diversified and interchangeable equipment simply consists of connecting the said circuits in parallel across the grounds 3 and 4, which requires only a few minutes time, and the utilization of transmitting facilities generally common to such rooms that have not heretofore been collectively employed in connection with audio or radio frequency transmission as herein shown.

From the foregoing, it will be apparent that the important and novel feature of the present system of transmission resides in the fact that practically all of the ethereal productions may be received and transmitted without the necessity of equipping any of the modern buildings with special wires to perform the services of the grounds 3 and 4, which are now shown to be available for audio frequency transmission without any installation labor or expense.

The present invention comprehends the use of any suitable master radio, and standard audio amplifiers, condensers, dials and the like, and since these devices are all well-known, none of them are shown or described in detail herein.

Obviously, any well-known non-inductive resistance may be shunted across the earphones for a hum filter instead of the series condensers, and other modifications and changes may also be made within the scope defined by the appended claims.

The present invention is extremely simple, and may be produced, installed, and operated at exceedingly low cost. By utilizing the grounded side 3 of the electric lighting circuit and an auxiliary ground line, as 4, which may comprise any common water, gas or steam pipe, both of the said lines being common to practically all large buildings, as well as most of the urban residences or dwellings, a satisfactory local transmission medium may be obtained with very little labor or expense, and the same ground lines may be resorted to wherever they may be found in a building, for the purpose of installing single series comprising a large number of the individual receiving and transmitting sets 7—7′ and 7c, without consuming any of the electric power of the lighting circuit 2—3, and without in any way weakening or interfering with the normal services of the said circuit.

Having thus described my invention, what I claim, is—

1. A transmission system having in combination with the grounded conductor of an electric lighting system and an auxiliary ground, an audio amplifier including an output primary coil, a low impedance secondary coil connected across said grounds and coupled with said output primary coil, a plurality of low impedance coils connected across said grounds in parallel, a plurality of loud speakers, and secondary coils coupled with the plurality of low impedance coils to transmit audible frequency currents from said grounds to the loud speakers.

2. A signal distributing system comprising an audio amplifier including an output primary coil, a pair of ground lines, a low impedance coil connected across said lines and coupled to said output coil whereby audio frequency currents may be induced in said ground lines, a plurality of coils whose total impedance approximates the impedance of said low impedance coil connected in parallel across said grounds whereby the audio energy in said grounds may be reconverted into audible frequency, a plurality of loud speakers, and a plurality of secondary coils coupled to the last named low impedance coils to transmit the audible frequency to said loud speakers.

3. The combination with a master radio including an audio amplifier and an output primary coil, of a pair of grounds one being a conductor of an electric lighting circuit, a low impedance coil connected across said grounds and coupled with said output primary coil, a plurality of low impedance primary coils connected in parallel across said grounds, a plurality of audible frequency receiving sets, including secondary coils whose impedance matches said sets coupled with the low impedance primary coils to transmit the audible frequency signals to the users of said sets.

4. A signal distributing system having in combination with a master radio and an audio amplifier including an output primary coil, a pair of grounded lines one line forming part of an electric lighting circuit, a low impedance secondary coil connected across said grounded lines and coupled with said output coil adapted to induce audio frequency currents in said grounded lines, a plurality of low impedance coils connected in parallel across said grounded lines adapted to reconvert the audio energy in said lines into sound waves, a plurality of loud speakers, and secondary coils coupled to the low impedance coils adapted to transmit the sound waves to the loud speakers.

5. A wireless transmission system having in combination with the grounded conductor of an electric lighting circuit and an auxiliary ground, and a master radio to control said system, an audio amplifier including an output primary coil, a low impedance secondary coil connected across said grounds and coupled with said output coil adapted to induce audio frequency currents in said grounds, a plurality of low impedance coils connected in parallel across said grounds and spaced progressively from said secondary coil adapted to reconvert said audio frequency currents in said grounds into sound waves, a plurality of loud speakers, and secondary coils coupled with the low impedance coils adapted to transmit the sound waves to the loud speakers.

6. A signal transmission system having in combination with the grounded conductor of an electric lighting system and an auxiliary ground, an audio amplifier including an output primary coil, a low impedance secondary coil connected across said grounds and coupled with said output primary coil, a plurality of low impedance coils connected across said grounds in parallel, and a plurality of receiving sets including secondary coils coupled with the low impedance coils to transmit the audible frequency signal.

7. A signal transmission system having in combination with the grounded conductor of an electric lighting system and an auxiliary ground, an audio amplifier, a low impedance coil connected across said grounds, means supplying energy from said amplifier to said coil to provide audio frequency currents in said grounds, and a plurality of low impedance receiving devices connected across said grounds adapted to convert the audio frequency currents in said ground lines into sound waves.

JACOB H. RUBENSTEIN.